US010591928B2

(12) United States Patent
Miura et al.

(10) Patent No.: US 10,591,928 B2
(45) Date of Patent: Mar. 17, 2020

(54) VEHICLE CONTROL DEVICE, VEHICLE CONTROL METHOD, AND COMPUTER READABLE STORAGE MEDIUM

(71) Applicant: HONDA MOTOR CO., LTD., Minato-ku, Tokyo (JP)

(72) Inventors: Hiroshi Miura, Wako (JP); Makoto Ishikawa, Wako (JP); Masamitsu Tsuchiya, Wako (JP); Koji Kawabe, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/149,173

(22) Filed: Oct. 2, 2018

(65) Prior Publication Data
US 2019/0107842 A1    Apr. 11, 2019

(30) Foreign Application Priority Data
Oct. 5, 2017    (JP) .................................. 2017-195362

(51) Int. Cl.
*G05D 1/02*    (2020.01)
*G06K 9/00*    (2006.01)
(Continued)

(52) U.S. Cl.
CPC ........... *G05D 1/0246* (2013.01); *B62D 6/001* (2013.01); *B62D 15/025* (2013.01);
(Continued)

(58) Field of Classification Search
CPC .............. B62D 15/025; B62D 15/0255; B62D 15/0265; B62D 6/001; G01S 13/865;
(Continued)

(56) References Cited

U.S. PATENT DOCUMENTS

2009/0046148 A1*  2/2009  Walter .................. B60S 1/0822
                                                        348/148
2012/0212612 A1*  8/2012  Imai .................... G06K 9/00798
                                                        348/148
(Continued)

FOREIGN PATENT DOCUMENTS

JP          11-203458          7/1999
JP     2000215396 A  *  8/2000
(Continued)

OTHER PUBLICATIONS

Japanese Office Action for Japanese Patent Application No. 2017-195362 dated Jul. 2, 2019.

*Primary Examiner* — Babar Sarwar
(74) *Attorney, Agent, or Firm* — Amin, Turocy & Watson, LLP

(57) ABSTRACT

A vehicle control device includes: an image capturer configured to image surroundings of a vehicle; a road partition line recognizer configured to recognize a position of a road partition line on the basis of an image; a driving controller configured to control at least steering of the vehicle on the basis of the position of the road partition line; and an object detector configured to detect objects in the vicinity of the vehicle by emitting radiowaves and detecting reflected waves generated due to the radiowaves coming into contact with the objects, wherein, in a case in which the position of the road partition line is unrecognizable using the road partition line recognizer, the driving controller is configured to control at least steering of the vehicle on the basis of the position of an object, of which the reflectivity is equal to or greater than a predetermined value.

5 Claims, 11 Drawing Sheets

(51) Int. Cl.

| | | |
|---|---|---|
| *G01S 13/93* | (2020.01) | |
| *G01S 13/86* | (2006.01) | |
| *B62D 6/00* | (2006.01) | |
| *B62D 15/02* | (2006.01) | |
| *G01S 13/931* | (2020.01) | |

(52) U.S. Cl.
CPC ..... *B62D 15/0255* (2013.01); *B62D 15/0265* (2013.01); *G01S 13/867* (2013.01); *G01S 13/931* (2013.01); *G05D 1/0257* (2013.01); *G06K 9/00798* (2013.01); *G01S 13/865* (2013.01); *G01S 2013/9342* (2013.01); *G05D 2201/0213* (2013.01)

(58) Field of Classification Search
CPC ............... G01S 13/867; G01S 13/931; G01S 2013/9342; G05D 1/0246; G05D 1/0257; G05D 2201/0213; G06K 9/00798
See application file for complete search history.

(56) References Cited

U.S. PATENT DOCUMENTS

| | | | |
|---|---|---|---|
| 2012/0253596 A1 | 10/2012 | Ibrahim et al. | |
| 2012/0283912 A1* | 11/2012 | Lee | B62D 1/286 701/41 |
| 2012/0327233 A1* | 12/2012 | Imai | G08G 1/167 348/148 |
| 2013/0060414 A1* | 3/2013 | Lee | B62D 1/286 701/23 |
| 2014/0009618 A1* | 1/2014 | Imai | G06K 9/00798 348/148 |
| 2014/0350836 A1* | 11/2014 | Stettner | G01S 7/481 701/301 |
| 2017/0222612 A1* | 8/2017 | Zollner | G08G 1/167 |
| 2019/0077459 A1* | 3/2019 | Miura | B62D 15/0265 |
| 2019/0107842 A1* | 4/2019 | Miura | G01S 13/867 |

FOREIGN PATENT DOCUMENTS

| | | |
|---|---|---|
| JP | 2004-104646 | 4/2004 |
| JP | 2005-265494 | 9/2005 |
| JP | 4055653 | 3/2008 |
| JP | 2008-158672 | 7/2008 |
| JP | 2009-258989 | 11/2009 |
| JP | 2016-043700 | 4/2016 |
| WO | 2017/013692 | 1/2017 |

* cited by examiner

VEHICLE CONTROL DEVICE, VEHICLE CONTROL METHOD, AND COMPUTER READABLE STORAGE MEDIUM

CROSS-REFERENCE TO RELATED APPLICATION

Priority is claimed on Japanese Patent Application No. 2017-195362, filed on Oct. 5, 2017, the content of which is incorporated herein by reference.

BACKGROUND OF THE INVENTION

Field of the Invention

The present invention relates to a vehicle control device, a vehicle control method, and a computer readable storage medium.

Description of Related Art

In recent years, automated control of vehicles (hereinafter, referred to as automated driving control) has been researched. In automated driving control, there are cases in which road partition line are recognized from an image captured by a camera, and a vehicle is caused to run on the basis of the recognized road partition lines (for example, Japanese Patent No. 4055653 and Japanese Patent Unexamined Application, First Publication No. H11-203458).

However, in a case in which a road partition line cannot be recognized from an image, the vehicle does not recognize an area in which the vehicle can run, and thus automated driving control is not realized in some cases.

An aspect of the present invention has been realized in consideration of such situations, and one object thereof is to provide a vehicle control device, a vehicle control method, and a computer readable storage medium capable of recognizing an area in which a vehicle can run with a high accuracy.

SUMMARY OF THE INVENTION

A vehicle control device, a vehicle control method, and a computer readable storage medium according to the present invention employ the following configurations.

(1): In one aspect of the present invention, there is provided a vehicle control device including: an image capturer configured to image surroundings of a vehicle; a road partition line recognizer configured to recognize a position of a road partition line on the basis of an image captured by the image capturer; a driving controller configured to control at least steering of the vehicle on the basis of the position of the road partition line recognized by the road partition line recognizer; and an object detector configured to detect objects in the vicinity of the vehicle by emitting radiowaves and detecting reflected waves generated due to the radiowaves coming into contact with objects, wherein, in a case in which the position of a road partition line is unrecognizable using the road partition line recognizer, the driving controller is configured to control at least the steering of the vehicle on the basis of the position of an object, of which a reflectivity is equal to or greater than a predetermined value, detected by the object detector.

(2): In the aspect (1) described above, in a case in which the position of the road partition line is unrecognizable using the road partition line recognizer, the driving controller is configured to control at least steering of the vehicle on the basis of positions of objects, of which a reflectivity is equal to or greater than a predetermined value, detected by the object detector and are disposed at predetermined intervals along a road.

(3): In the aspect (2) described above, in a case in which the position of the road partition line is unrecognizable using the road partition line recognizer, the driving controller is configured to estimate positions of ends of a road in a widthwise direction on the basis of positions of objects, of which a reflectivity is equal to or greater than a predetermined value, detected by the object detector and which are disposed at predetermined intervals along the road and is configured to control at least steering of the vehicle on the basis of the positions of the ends.

(4): In the aspect (2) described above, in a case in which the position of the road partition line is unrecognizable using the road partition line recognizer, and a positional relationship between objects, of which a reflectivity is equal to or greater than a predetermined value, disposed at predetermined intervals along a road and a road partition line is recorded in map information, the driving controller is configured to control at least steering of the vehicle on the basis of positions of the objects, of which the reflectivity is equal to or greater than a predetermined value, disposed at the predetermined intervals along the road and the positional relation.

(5): In any one of the aspects (1) to (4) described above, in a case in which the position of the road partition line is unrecognizable using the road partition line recognizer, and positions of objects, of which a reflectivity is equal to or greater than a predetermined value, are recorded in map information, the driving controller is configured to control at least steering of the vehicle on the basis of the positions of the objects, of which a reflectivity is equal to or greater than a predetermined value, detected by the object detector.

(6): In an aspect of the present invention, there is provided a vehicle control method including: imaging surroundings of a vehicle using an image capturer; recognizing a position of a road partition line on the basis of an image captured by the image capturer using a road partition line recognizer; controlling at least steering of the vehicle on the basis of the position of the road partition line recognized by the road partition line recognizer using a driving controller; detecting objects in the vicinity of the vehicle by emitting radiowaves and detecting reflected waves generated due to the radiowaves coming into contact with the objects using an object detector; and controlling at least steering of the vehicle on the basis of a position of an object, of which a reflectivity is equal to or greater than a predetermined value, detected by the object detector using the driving controller in a case in which the position of the road partition line is unrecognizable using the road partition line recognizer.

(7) According to one aspect of the present invention, there is provided a non-transitory computer-readable storage medium that stores a computer program to be executed by a computer to perform at least: image surroundings of a vehicle detect objects in the vicinity of the vehicle by emitting radiowaves and detect reflected waves generated due to the radiowaves coming into contact with the objects to execute: recognize a position of a road partition line on the basis of the image imaged; control at least steering of the vehicle on the basis of the position of the recognized road partition line; and control at least steering of the vehicle on the basis of a position of an object, of which a reflectivity is equal to or greater than a predetermined value, detected by the object detector in a case in which the position of the road partition line is unrecognizable.

According to the aspects (1) to (7), an area in which a vehicle can run can be recognized with a higher accuracy.

DETAILED DESCRIPTION OF THE INVENTION

Hereinafter, a vehicle control device, a vehicle control method, and a computer readable storage medium according to embodiments of the present invention will be described with reference to the drawings.

Figure 1:
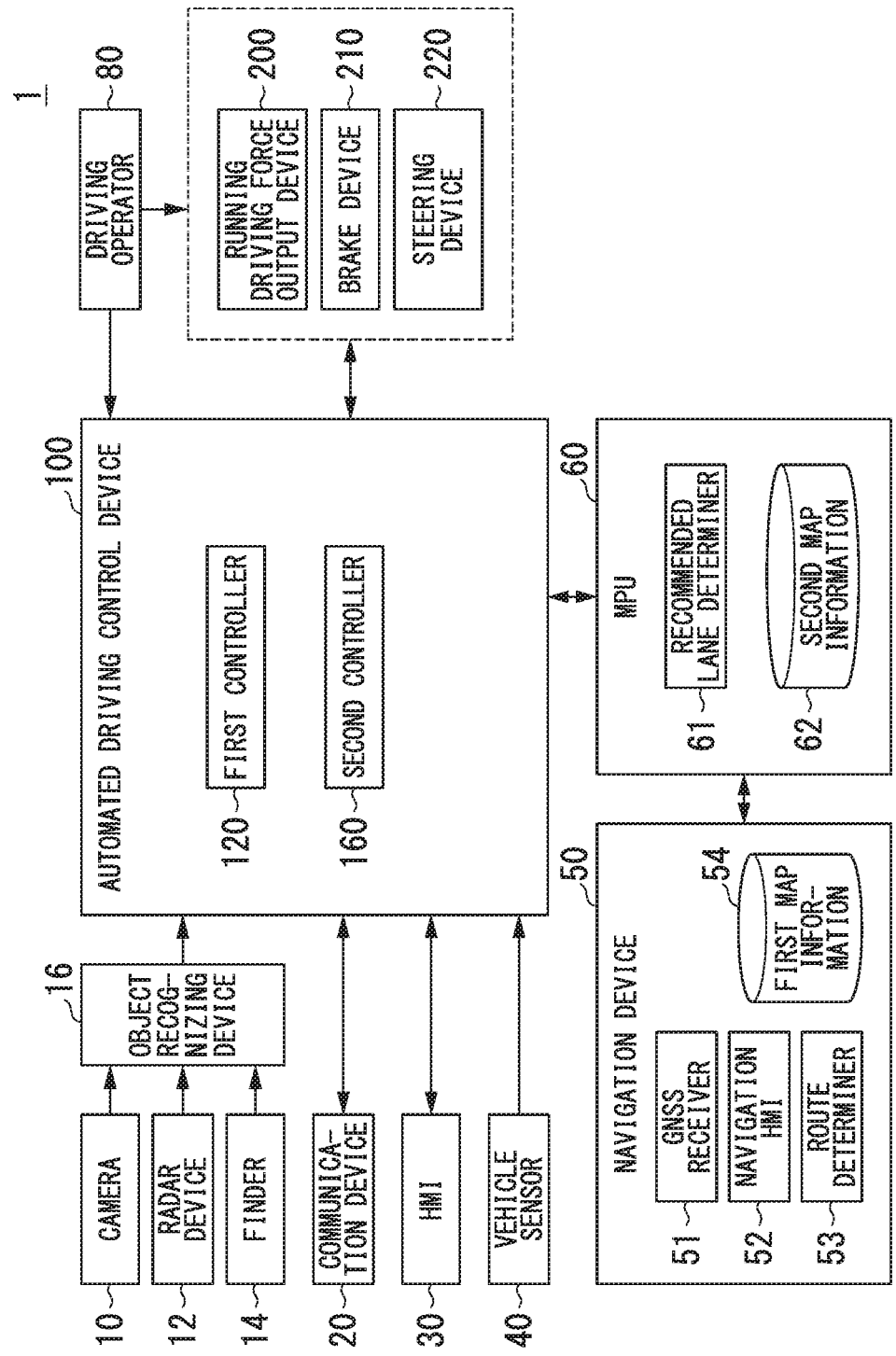
FIG. 1 is a configuration diagram of a vehicle control system using a vehicle control device according to an embodiment.

FIG. 1 is a configuration diagram of a vehicle system 1 using a vehicle control device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. In a case in which an electric motor is included, the electric motor operates using power generated using a power generator connected to an internal combustion engine or discharge power of a secondary cell or a fuel cell.

[Overall Configuration]

The vehicle system 1, for example, includes a camera 10, a radar device 12, a finder 14, an object recognizing device 16, a communication device 20, a human machine interface (HMI) 30, a vehicle sensor 40, a navigation device 50, a map positioning unit (MPU) 60, a driving operator 80, an automated driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration shown in FIG. 1 is merely one example, and thus, a part of the configuration may be omitted, and, furthermore, other components may be added thereto.

The camera 10, for example, is a digital camera using a solid-state imaging device such as a charge coupled device (CCD) or a complementary metal oxide semiconductor (CMOS). One or a plurality of cameras 10 are installed at arbitrary places on a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position of (a distance and an azimuth to) an object by detecting radiowaves (reflected waves) reflected by the object. One or a plurality of radar devices 12 are installed at arbitrary places on the subject vehicle M. The radar device 12 may detect a position and a speed of an object using a frequency modulated continuous wave (FM-CW) system.

The finder 14 is a light detection and ranging (LIDAR) device. The finder 14 emits radiowaves such as light to the vicinity of the subject vehicle M and detects reflected waves generated when the emitted radiowaves come in contact with an object. The finder 14 detects a distance to a target, a type of the target, and the like on the basis of a result of the detection of the reflected waves. Here, the result of the detection, for example, is a time from the emission of radiation waves to the detection of reflected waves, the amount of radiation of the reflected waves, a reflectivity that is the state of the reflected waves with respect to the emitted radiation waves, and the like. The emitted light, for example, is a pulse-form laser light. One or a plurality of finders 14 are mounted at arbitrary positions on the subject vehicle M. The object recognizing device 16 or the automated driving control device 100 may perform a process of detecting a distance to a target, a type of target, and the like on the basis of the result of detection of reflected waves.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automated driving control device 100. In addition, the object recognizing device 16, as is necessary, may output results of detection using the camera 10, the radar device 12, and the finder 14 to the automated driving control device 100 as they are without processing them.

For example, the object recognizing device 16 determines whether or not a position of a road partition line can be recognized on the basis of an image captured by the camera 10. In a case in which a position of a road partition line can be recognized, the object recognizing device 16 outputs information representing the position of the road partition line to the automated driving control device 100. On the other hand, in a case in which a position of a road partition line cannot be recognized, the object recognizing device 16 outputs information representing that the position of a road partition line cannot be recognized to the automated driving control device 100. Details of this determination process will be described in [Recognition of road partition line] to be described later.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a route determiner 53 and stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or complemented by an inertial navigation system (INS) using an output of the vehicle sensor 40. The navigation HMI 52 includes a display device, a speaker, a touch panel, a key, and the like. A part or the whole of the functions or the configurations of the navigation HMI 52 and the HMI 30 described above may be configured to be shared. The route determiner 53, for example, determines a route to a destination input by a vehicle occupant operating the navigation HMI 52 (hereinafter, referred to as a route on a map) by referring to a location of the subject vehicle M identified by the GNSS receiver 51 (or an input arbitrary location) and the first map information 54. The first map information 54, for example, is information in which a road form is represented by respective links representing a road and respective nodes connected using the links. The first map information 54 may include a curvature of each road, point of interest (POI) information, and the like. The route on the map determined by the route determiner 53 is output to the MPU 60. In addition, the navigation device 50 may perform route guidance using the navigation HMI 52 on the basis of the route on the map determined by the route determiner 53. The navigation device 50, for example, may be realized by a function of a terminal device such as a smartphone or a tablet terminal held by a vehicle occupant. In addition, the navigation device 50 may transmit a current location and a destination to a navigation server through the communication device 20 and acquire a route on the map received from the navigation server as a reply.

The MPU 60, for example, functions as a recommended lane determiner 61. The MPU 60 includes a storage device such as a HDD or a flash memory. In this storage device, second map information 62 is stored. The recommended lane determiner 61 divides a route provided from the navigation device 50 into a plurality of blocks (for example, divides the route into blocks of 100 [m] in the advancement direction of the vehicle) and determines a recommended lane for each block by referring to the second map information 62. The recommended lane determiner 61 determines on which of lanes numbered from the left side to run. In a case in which a branching place, a merging place, or the like is present in the route, the recommended lane determiner 61 determines a recommended lane such that the subject vehicle M can run on a reasonable route for advancement to divergent destinations.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone number information, and the like may be included. By accessing another device using the communication device 20, the second map information 62 may be updated as needed.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device 100 or some or all of the running driving force output device 200, the brake device 210, and the steering device 220.

The automated driving control device 100, for example, includes a first controller 120, and a second controller 160. Each of the first controller 120 and second controller 160, for example, is implemented by a hardware processor such as a central processing unit (CPU) executing a program (software). In addition, some or all of such constituent elements may be implemented by hardware (a circuit unit; including circuitry) such as a large scale integration (LSI), an application specific integrated circuit (ASIC), a field-programmable gate array (FPGA), or a graphics processing unit (GPU) or may be implemented by cooperation between software and hardware. The program may be stored in a storage device such as a hard disk drive (HDD) or a flash memory or may be stored in a storage medium such as a DVD or a CD-ROM that can be loaded or unloaded and installed in a storage device by loading the storage medium into a drive device.

Figure 2:
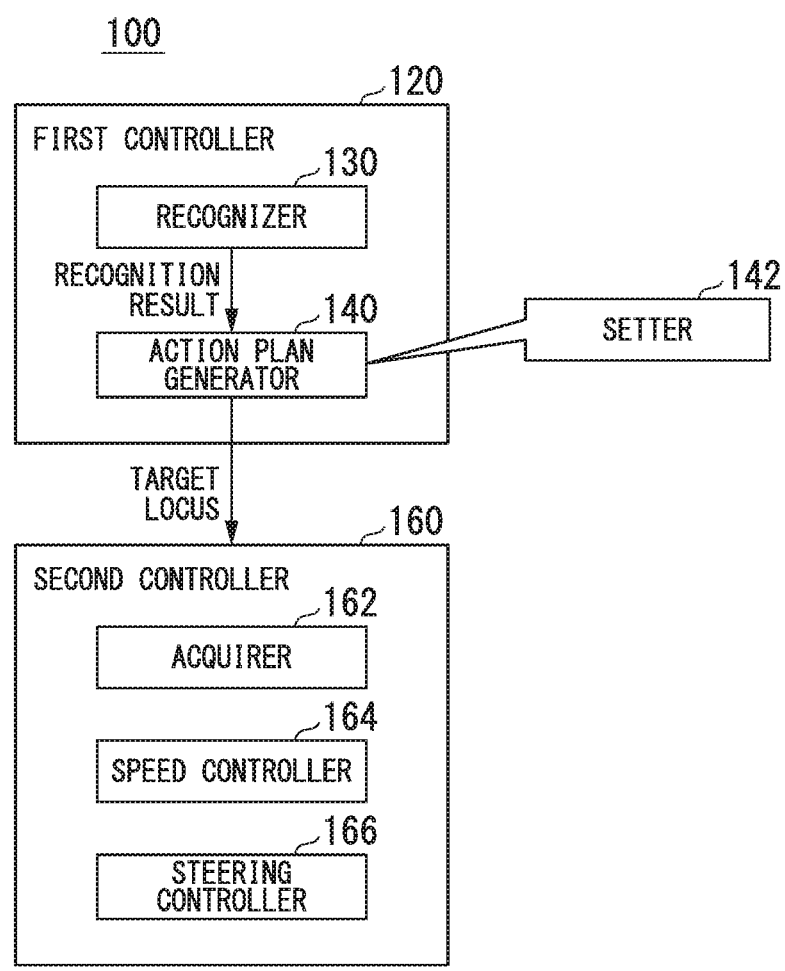
FIG. 2 is a functional configuration diagram of a first controller and a second controller.

FIG. 2 is a functional configuration diagram of the first controller 120 and the second controller 160. The first controller 120, for example, includes a recognizer 130 and an action plan generator 140. The first controller 120, for example, simultaneously implements functions using artificial intelligence (AI) and functions using a model provided in advance. For example, a function of "recognizing an intersection" may be implemented by executing recognition of an intersection using deep learning or the like and recognition based on conditions given in advance (a signal, road markings, and the like that can be used for pattern matching are present) at the same time and comprehensively evaluating scores given to execution results thereof. Accordingly, the reliability of automated driving is secured.

The recognizer 130 recognizes states such as a position, a speed, an acceleration, and the like of each object present in the vicinity of the subject vehicle M on the basis of information input from the camera 10, the radar device 12, and the finder 14 through the object recognizing device 16. The position of an object, for example, is recognized as a position on an absolute coordinate system having a representative point (the center of gravity, the center of a driving shaft, or the like) of the subject vehicle M as its origin. The position of the object is used for various control processes. The position of an object may be represented as a representative point such as the center of gravity or a corner of an object or may be represented as the represented area. A "state" of an object may include an acceleration, a jerk, or an "action state" of an object. For example, the "action state" is a state representing whether or not the object is changing lanes or to change lanes. In addition, the recognizer 130 recognizes the shape of a curve along which the subject vehicle M will pass subsequently on the basis of a captured image captured by the camera 10. The recognizer 130 converting the shape of the curve from the captured image captured by the camera 10 into an actual plane. For example, executes a process of representing the shape of the curve using two-dimensional point sequence information or a model equivalent thereto on the basis of a result of the conversion and outputs the information based on a processing result to the action plan generator 140 as information representing the shape of the curve.

The recognizer 130, for example, recognizes a lane (running lane) in which the subject vehicle M is running. For example, the recognizer 130 compares a pattern of road partition lines acquired from the second map information 62 (for example, an array of solid lines and broken lines) with a pattern of road partition lines in the vicinity of the subject vehicle M that has been recognized from an image captured by the camera 10 and recognizes a running lane on the basis of a result of the comparison. The recognizer 130 is not limited to recognizing road partition lines and may recognize a running lane by recognizing running lane boundaries (road boundaries) including a road partition line, a road shoulder, curbstones, a median strip, a guardrail, and the like. In the recognition, the position of the subject vehicle M acquired from the navigation device 50 or a result of the process executed by an INS may be additionally taken into account. In addition, the recognizer 130 may recognize a temporary stop line, an obstacle object, a red light, a tollgate, and other road events.

When a running lane is recognized, the recognizer 130 recognizes a position and a posture of the subject vehicle M with respect to the running lane. The recognizer 130, for example, may recognize a deviation of a reference point on the subject vehicle M with respect to the center of the lane and an angle between a line along the lane center in the advancement direction of the subject vehicle M and the lane center as a relative position and a posture of the subject vehicle M with respect to the running lane. Instead of this, the recognizer 130 may recognize a position of a reference point on the subject vehicle M with respect to a first side end part (a road partition line or a road boundary) of the running lane or the like as a relative position of the subject vehicle M with respect to the running lane.

In the recognition process described above, the recognizer 130 may derive a recognition accuracy and output the derived recognition accuracy to the action plan generator 140 as recognition accuracy information. For example, the recognizer 130 may generate recognition accuracy information on the basis of a frequency at which a road partition line is recognized over a predetermined time period.

The recognizer 130 acquires a detection result, which is acquired by the finder 14, output by the object recognizing device 16 and detects objects in the vicinity of the vehicle on the basis of the acquired detection result. Objects in the vicinity of the vehicle, for example, are objects used for deriving an area in which the vehicle can run in a case in which a road partition line is not recognized. Objects used for deriving a runnable area are objects of which a reflectivity that is an index of reflected waves for radiation waves radiated by the finder 14 is equal to or greater than a predetermined value. For example, such objects include sight line guiding facilities (delineator, traffic delineator), a guard rail of which a reflectivity is equal to or greater than a predetermined value, and a road lamp, marks, signals, and the like disposed along a road. For example the delineator is a reflecting device mounted at the side of the roadway, in series, to indicate the alignment of the roadway. In the following description, an object of which a reflectivity is equal to or greater than a predetermined value will be described as being a delineator.

The action plan generator 140 determines events to be sequentially executed in automated driving such that the subject vehicle basically runs on a recommended lane determined by the recommended lane determiner 61 and can respond to a surroundings status of the subject vehicle M. As the events, for example, there are a constant-speed running event for running at a constant speed in the same running lane, a following running event of following a vehicle running ahead, an overtaking event of overtaking a vehicle running ahead, an avoidance event of performing braking and/or steering for avoiding approaching an obstacle object, a curved running event of running on a curve, a passing through event for passing through a predetermined point such as an intersection, a pedestrian crossing, a railroad crossing, or the like, a lane change event, a merging event, a branching event, an automated stopping event, a takeover event for ending automated driving and switching to manual driving, and the like. A following running event is an event in which a vehicle runs behind a vehicle running ahead while maintaining a predetermined inter-vehicle distance from the vehicle running ahead.

The action plan generator 140 generates a target locus along which the subject vehicle M will run in the future in accordance with operating events. The details of each functional unit will be described later. The target locus, for example, includes a speed element. For example, the target locus is represented by sequentially aligning places (locus points) at which the subject vehicle M is to arrive. A locus point is a place at which the subject vehicle M will arrive at respective predetermined running distances (for example, about every several [m]) as distances along the road, and separately, a target speed and a target acceleration for each of predetermined sampling times (for example, a fraction of a [sec]) are generated as a part of the target locus. A locus point may be a position at which the subject vehicle M will arrive at a sampling time. The sampling time is a time set at a predetermined interval. In such a case, information of a target speed or a target acceleration is represented using intervals between the locus points.

Figure 3:
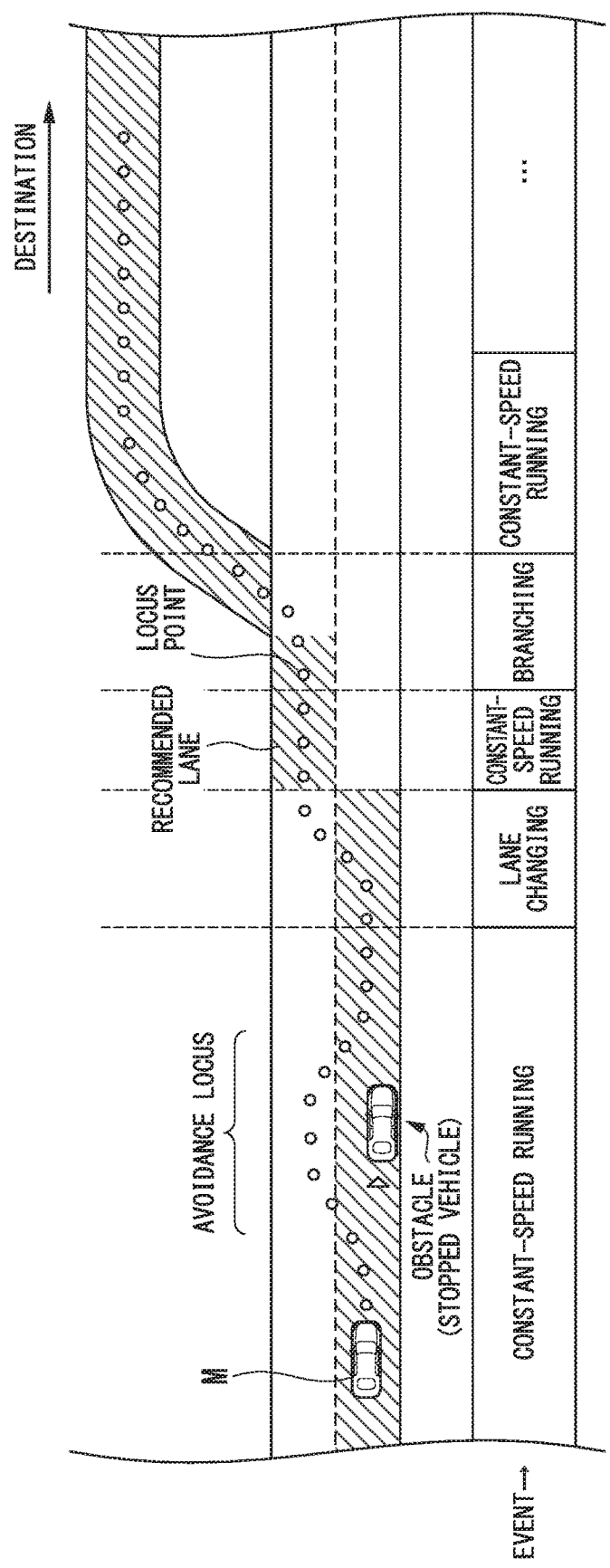
FIG. 3 shows a diagram showing a view in which a target locus is generated on the basis of a recommended lane.

FIG. 3 is a diagram showing a view in which a target locus is generated on the basis of recommended lanes. As shown in the drawing, the recommended lanes are set such that surroundings are convenient for running along a route to a destination. When reaching a predetermined distance before a place at which a recommended lane is changed (may be determined in accordance with a type of event), the action plan generator 140 executes the passing through event, the lane change event, the branching event, the merging event, or the like. During execution of each event, in a case in which there is a need to avoid an obstacle object, an avoidance locus is generated as shown in the drawing.

The action plan generator 140, for example, includes a setter 142. The setter 142 sets marks for setting an area in which the subject vehicle M can run or a runnable area on the basis of objects of which a reflectivity recognized by the recognizer 130 is equal to or greater than a predetermined value in a case in which a road partition line is not recognized.

The second controller 160 performs control of the running driving force output device 200, the brake device 210, and the steering device 220 such that the subject vehicle M passes along a target locus generated by the action plan generator 140 at a scheduled time.

Referring back to FIG. 2, the second controller 160, for example, includes an acquirer 162, a speed controller 164, and a steering controller 166. The acquirer 162 acquires information of a target locus (locus point) generated by the action plan generator 140 and stores the target locus information in a memory (not shown). The speed controller 164 controls the running driving force output device 200 or the brake device 210 on the basis of a speed element accompanying the target locus stored in the memory. The steering controller 166 controls the steering device 220 in accordance with a degree of curvature of the target locus stored in the memory. The processes of the speed controller 164 and the steering controller 166, for example, are implemented by a combination of feed forward control and feedback control. For example, the steering controller 166 may execute feed forward control according to the curvature of a road in front of the subject vehicle M and feedback control based on a deviation from the target locus in combination.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

As will be described below, the automated driving control device 100 controls at least steering of the subject vehicle M on the basis of a position of an object, of which a reflectivity is equal to or greater than a predetermined value, detected by the recognizer 130. [Specific process example 1] to be described later is one example of a process of a case in which a positional relationship between an object (delineator), of which a reflectivity is equal to or greater than a predetermined value, and a road partition line is not stored in the second map information 62. [Specific process example 2] is one example of a process of a case in which a positional relationship between a delineator and a road partition line is stored in the second map information 62.

Specific Process Example 1

[Recognition of Road Partition Line]

Figure 4:
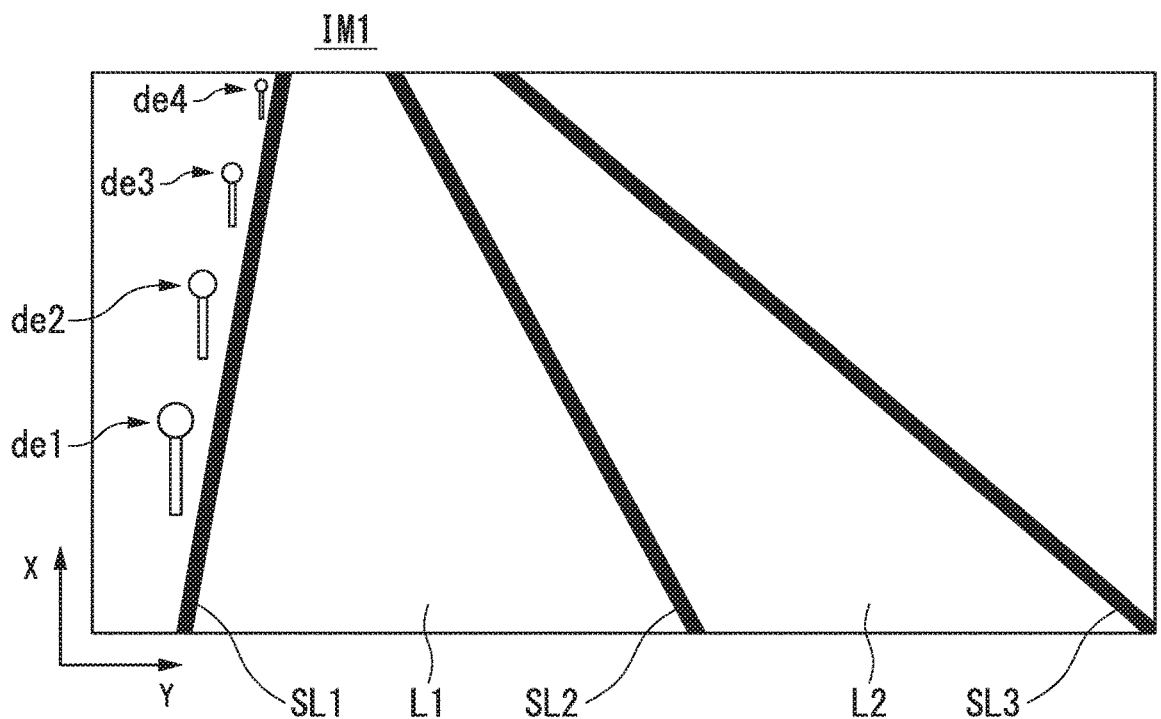
FIG. 4 is a diagram showing one example of an image captured by a camera.

FIG. 4 is a diagram showing one example of an image IM1 captured by the camera 10. Hereinafter, in the image IM1 and the like, an upward direction (an advancement direction of a vehicle) will be referred to as a direction X, and a horizontal direction (a widthwise direction of the vehicle) will be referred to as a direction Y. The image IM1 includes a lane L1 in which the subject vehicle M is running, a lane L2 that is an opposite lane of the lane L1, a road partition line SL1 drawn on the left side (−Y side) of the lane L1, a road partition line SL2 partitioning the lane L1 and the lane L2, and a road partition line SL3 drawn on the right side (+Y side) of the lane L2.

The image IM1 includes delineators de1 to de4 disposed on the left side of the road partition line SL1. The delineators de1 to de4 are present in order of the delineators de1, de2, de3, and de4 from the front side (−X side) of the image IM1 at predetermined intervals. The delineators de1 to de4 are one example of "objects disposed at predetermined intervals along a road."

The object recognizing device 16 acquires luminance gradients between a pixel of interest and pixels adjacent thereto using a Sobel filter or the like for the image IM1 and extracts each area having gradients of a threshold or more among the acquired luminance gradients as an edge. Then, the object recognizing device 16 determines whether or not a road partition line can be recognized on the basis of the extracted edges. For example, in a case in which the extracted edges satisfy a predetermined condition, the object recognizing device 16 determines that a road partition line can be recognized. For example, the object recognizing device 16 may apply a predetermined algorithm to the extracted edges and, in a case in which a result of the application satisfies a predetermined condition, determine that a road partition line can be recognized.

Figure 5:
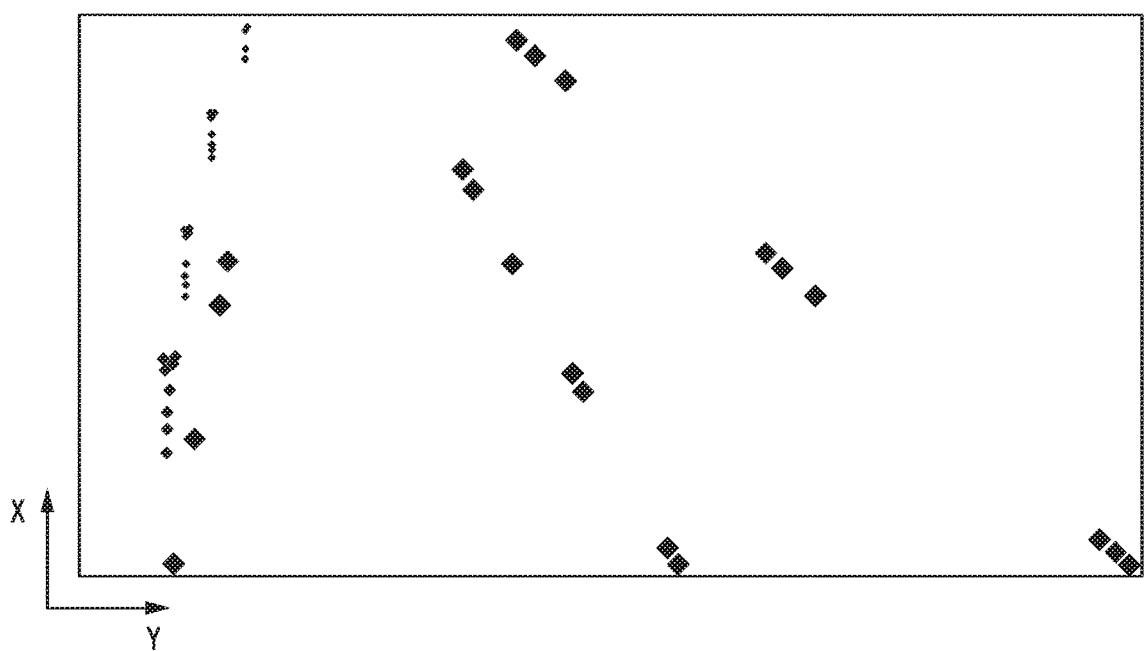
FIG. 5 is a diagram showing one example of a case in which it is determined that a road partition line cannot be recognized.

For example, in a case in which the number of extracted edges is less than a predetermined pixel number, it is determined that a road partition line cannot be recognized. FIG. 5 is a diagram showing one example of a case in which it is determined that a road partition line cannot be recognized. FIG. 5 shows a result of extraction of edges in the image shown in FIG. 4.

[Recognition of Delineator]

The recognizer 130 acquires a result of detection, which is acquired by the finder 14, output by the object recognizing device 16 and detects delineators on the basis of the acquired result of the detection. For example, the recognizer 130 selects a front-most position in the direction X on the basis of the result of the detection acquired by the finder 14 and acquires a reflectivity by scanning in the direction Y. This process will be referred to as "one scanning process." Then, the recognizer 130 repeats the process of scanning in the direction Y and acquiring a reflectivity as described above while shifting the selected position in the direction X to the direction +X. By performing such a process for the image IM1, reflectivities in the entire image are acquired.

Figure 6:
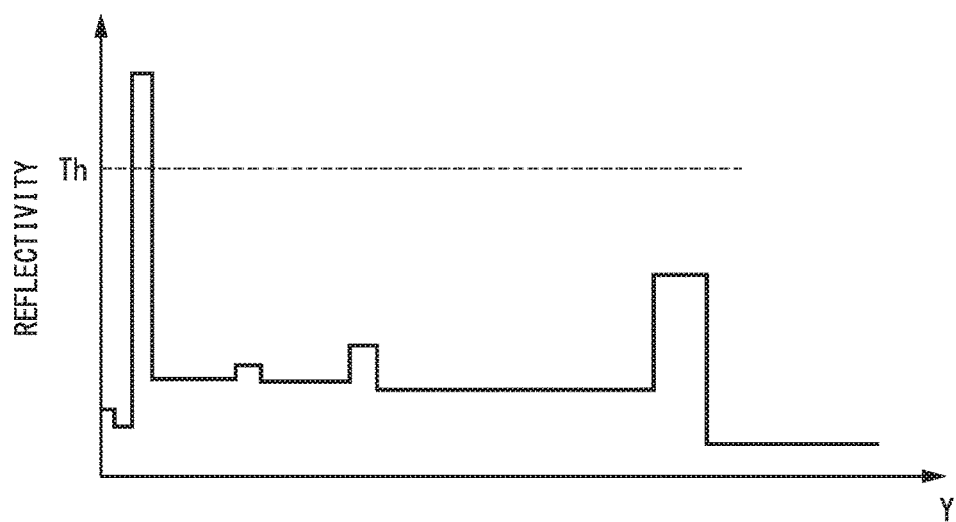
FIG. 6 is a diagram showing one example of a processing result when a predetermined one scanning process is executed.
Figure 7:
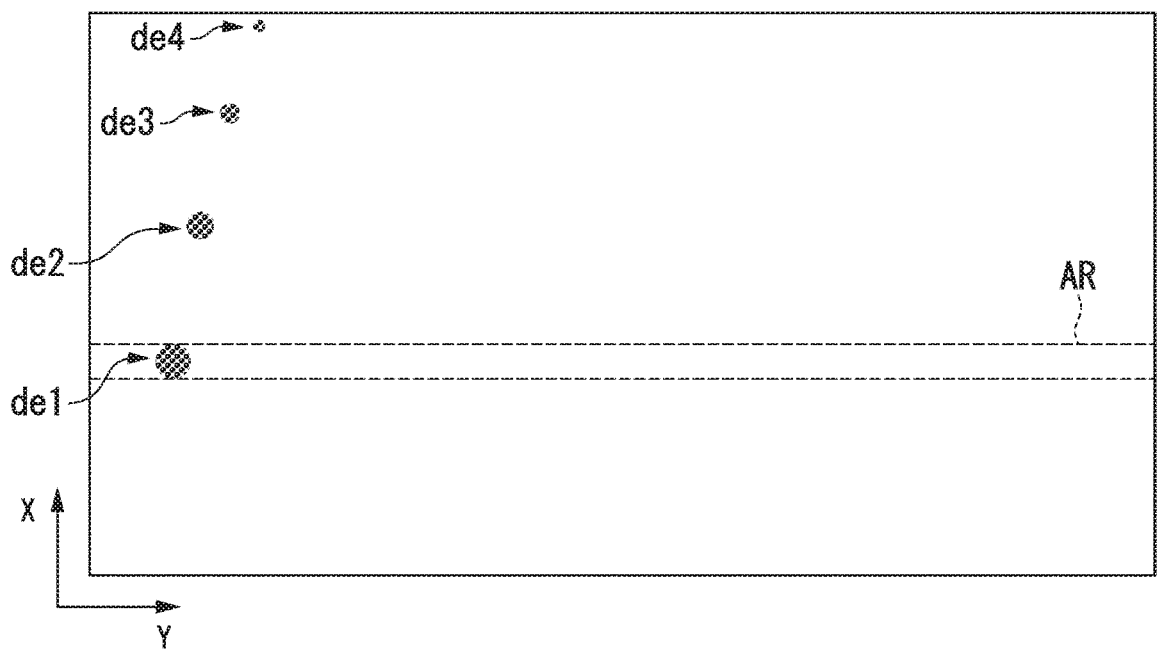
FIG. 7 is a diagram showing one example of positions of delineators converted into positions on an actual plane.

FIG. 6 is a diagram showing one example of a processing result when a predetermined one scanning process is executed. An area for which one scanning process shown in FIG. 6 is executed corresponds to an area AR shown in FIG. 7 to be described later. A vertical axis of FIG. 6 represents a reflectivity, and a horizontal axis of FIG. 6 represents a position in the direction Y. For example, the recognizer 130 extracts areas having a reflectivity of a predetermined value Th or more. This area, for example, is assumed to be an area in which a delineator is present. Then, the recognizer 130 converts positions of the extracted areas into positions on an actual plane, thereby recognizing positions of the delineators de1 to de4. FIG. 7 is a diagram showing one example of positions of delineators de1 to de4 converted into positions on an actual plane.

[Process of Setting Runnable Area]

Figure 8:
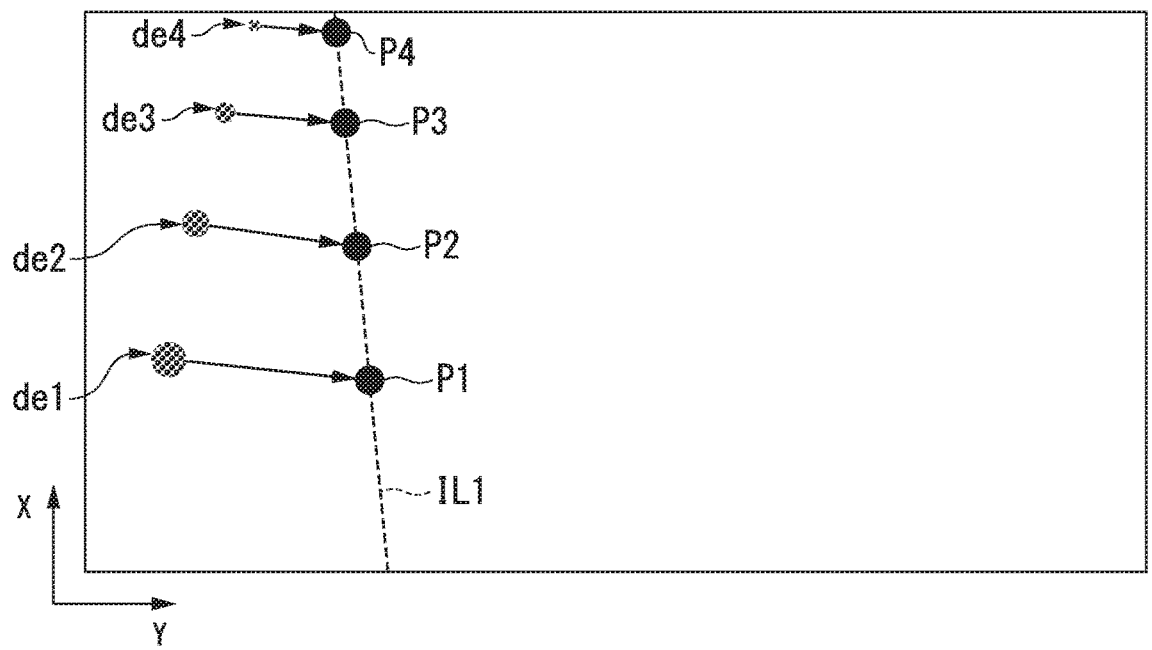
FIG. 8 is a diagram showing one example of a process result acquired by a setter.

The setter 142 sets marks used for setting an area in which the subject vehicle M can run and a runnable area on the basis of the delineators de1 to de4 shown in FIG. 7. FIG. 8 is a diagram showing one example of a process result acquired by the setter 142. For example, the setter 142 sets positions P1 to P4 located at a predetermined distance in the direction +Y (or a predetermined distance in the +Y direction at an angle θ) respectively from the positions of the delineators de1 to de4. The setter 142 sets a virtual line IL1 set in the direction X such that it passes through the set positions P1 to P4. The predetermined distance, for example, is a distance acquired by adding a margin distance to a half of a distance corresponding to the width of the subject vehicle M. Then, the setter 142 sets the virtual line IL1 as a target locus.

Figure 9:
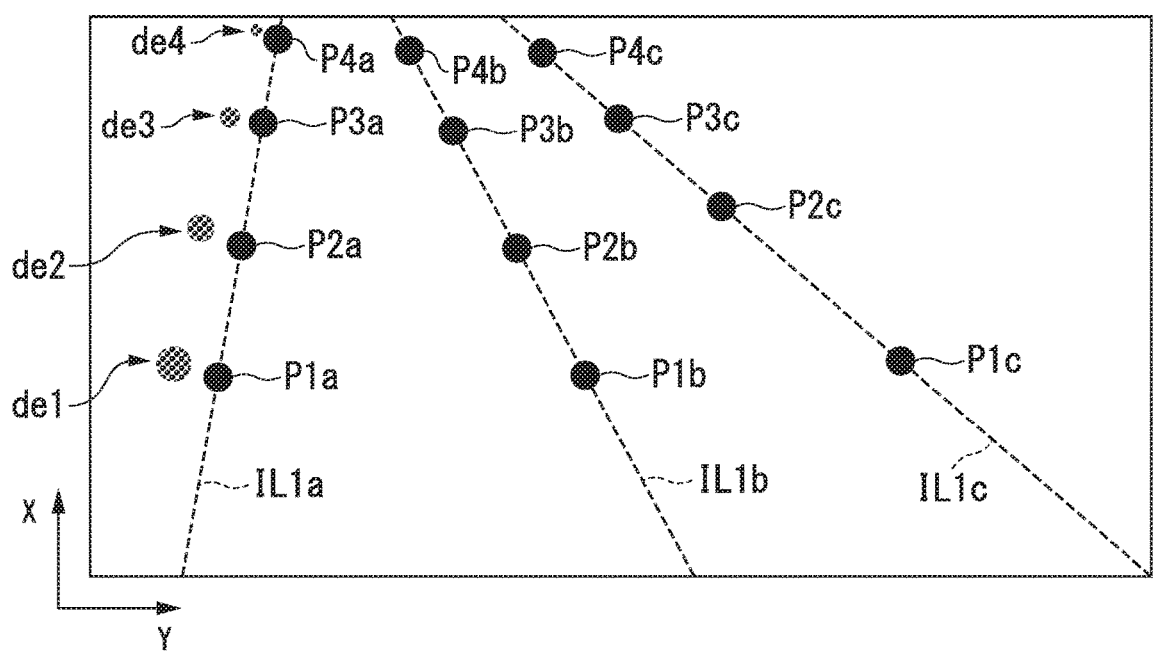
FIG. 9 is a diagram showing another example of a process result acquired by a setter.

In the example described above, the setter 142 has been described to set the virtual line IL1 corresponding to a target locus, instead of (or in addition to) this, a road partition line or a lane may be set. For example, the setter 142, as shown in FIG. 9, sets positions P1a to P4a at points of a first distance, sets positions P1b to P4b at points of a second distance, and sets positions P1c to P4c at points of a third distance respectively from the positions of the delineators de1 to de4 in the direction +Y. The positions P1a to P4a or the positions P1c to P4c are one example of "positions of ends of a road in a widthwise direction."

The first distance is a distance estimated as a position of an end of a road in the widthwise direction that is closest to a delineator set in advance. The second distance is a distance corresponding to a width of a lane corresponding to one lane that is set in advance from a point of the first distance. The third distance is a distance corresponding to a width of a lane corresponding to one lane that is set in advance from a point of the second distance. In a case in which the number of lanes and a lane width near the detected delineator are stored in the second map information 62, the second distance and the third distance are set on the basis of the number of lanes and the lane width.

Then, the setter 142 sets a virtual line IL1a set in the direction X such that it passes through the positions P1a to P4a, sets a virtual line IL1b set in the direction X such that it passes through the positions P1b to P4b, and sets a virtual line ILc in the direction X such that it passes through the positions P1c to P4c. Furthermore, the setter 142 regards the virtual lines IL1a to IL1c as road partition lines, regards a lane partitioned by the virtual line IL1a and the virtual line ILb as a lane in which the subject vehicle M is running, and regards a lane partitioned by the virtual line IL1b and the virtual line ILc as a lane adjacent to the lane in which the subject vehicle M is running. The action plan generator 140 generates a target locus on the basis of the lanes set by the setter 142.

[Example of Case in which Delineators are Present at Both Ends of Road]

Figure 10:
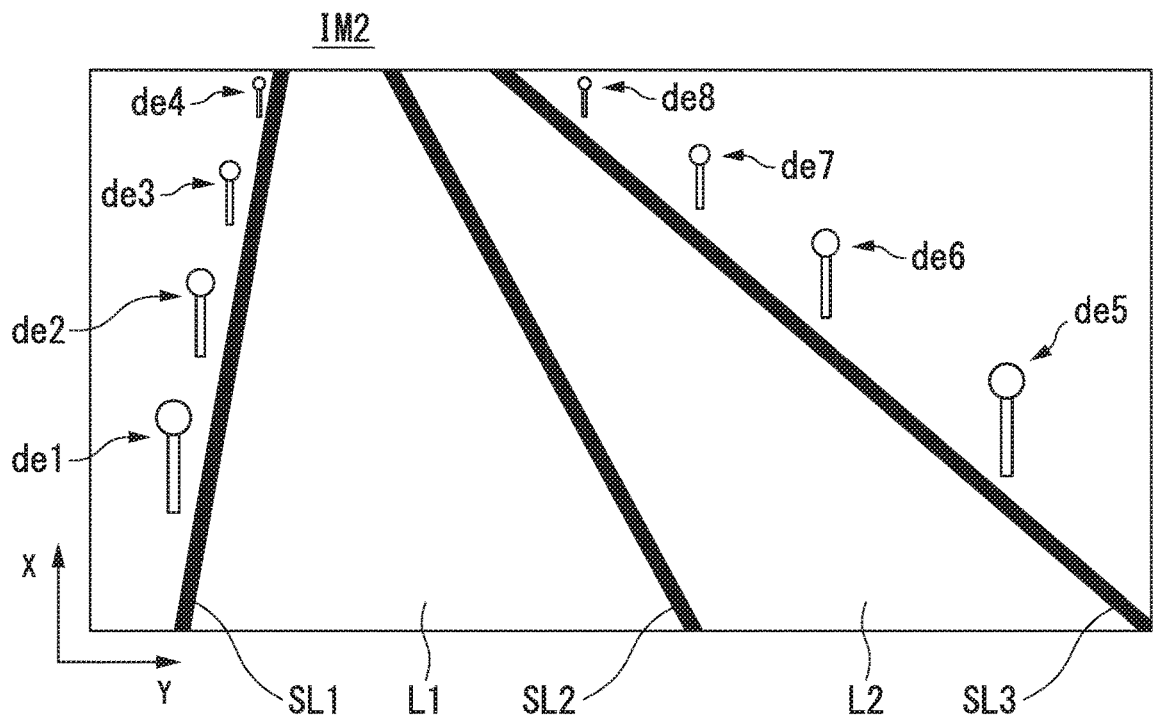
FIG. 10 is a diagram showing one example of an image in which a road having delineators at both ends is captured.

FIG. 10 is a diagram showing one example of an image IM2 in which a road having delineators at both ends is captured. Points different from the image IM1 will be focused on in the description. The image IM2 includes delineators de5 to de8 disposed on the right side of a road partition line SL3. The delineators de5 to de8 are installed in order of the delineators de5, de6, de7, and de8 from the front side (−X side) of the image IM2 at predetermined intervals. The delineators de5 to de8 are one example of "objects disposed at predetermined intervals along a road."

The recognizer 130 detects delineators on the basis of a result of detection, which is acquired by the finder 14, output by the object recognizing device 16. Then, the recognizer 130 converts positions of the detected delineators into positions on an actual plane, thereby recognizing positions of the delineators de1 to de8.

Figure 11:
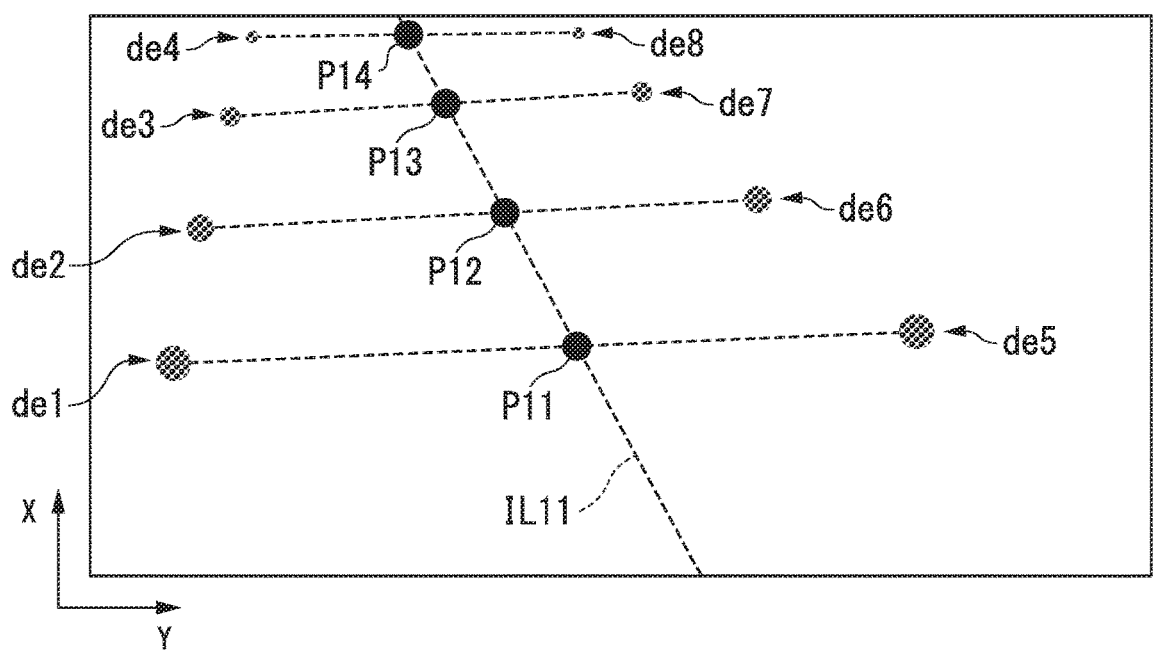
FIG. 11 is a diagram showing one example of positions of delineators converted into positions on an actual plane.

FIG. 11 is a diagram showing one example of positions of delineators de1 to de8 converted into positions on an actual plane. The setter 142 sets a runnable area on the basis of the delineators de1 to de8. For example, the setter 142 extracts a set of delineators present on the same coordinates or coordinates close to each other in the direction X among the delineators de1 to de8. For example, the delineators de1 and de5, the delineators de2 and de6, the delineators de3 and de7, and the delineators de4 and de8 are respectively extracted as one set.

The setter 142 joins the delineators extracted respectively as sets using virtual lines and sets positions P11 to P14 that are center points of the virtual lines. Furthermore, the setter 142 sets a virtual line IL11 set in the direction X such that it passes through the set positions P11 to P14. Then, the setter 142 connects positions. The positions are positions set to a predetermined distance from the set virtual line IL11 in the direction −Y as a target locus.

Figure 12:
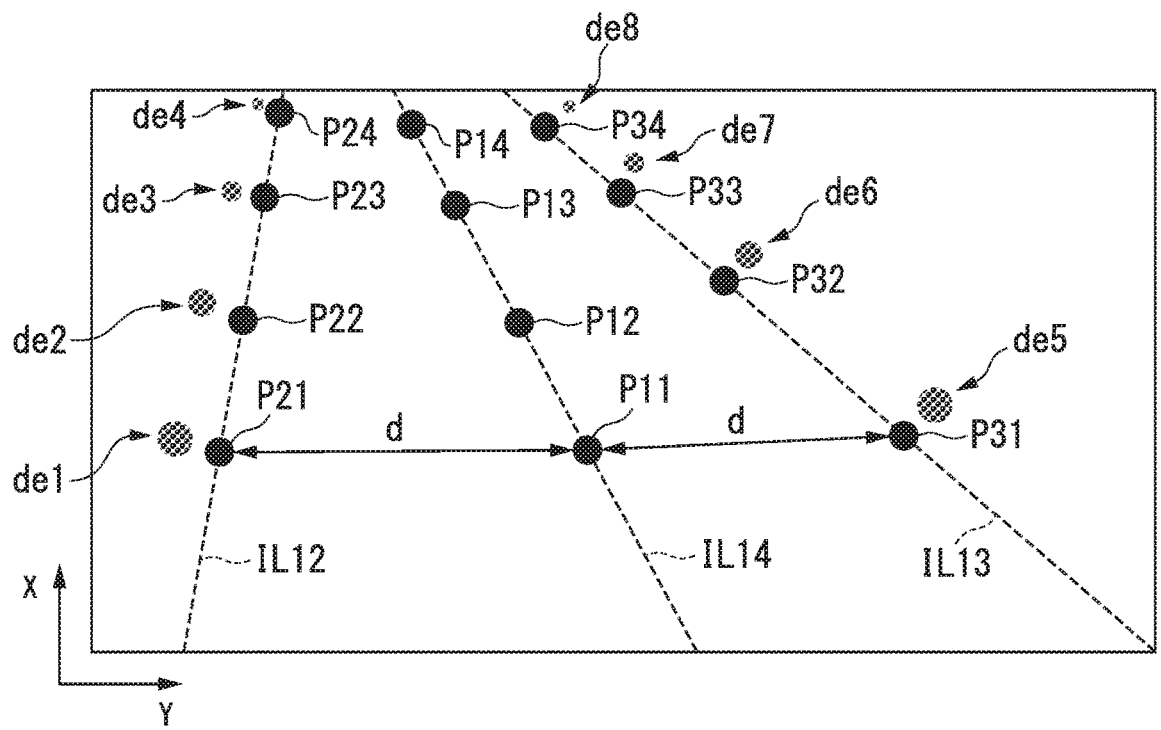
FIG. 12 is a diagram showing one example of a view in which a runnable area is set.

The setter 142 may set a runnable area as shown in FIG. 12. For example, the setter 142 sets positions P21 to P24 of a predetermined distance from the positions of the delineators de1 to de4 in the direction +Y and sets a virtual line IL12 set in the direction X such that it passes through the set positions. The setter 142 sets positions P31 to P34 of a predetermined distance from the positions of the delineators de5 to de8 in the direction −Y and sets a virtual line IL13 set in the direction X such that it passes through the set positions.

Then, the setter 142 derives an interval between the virtual lines IL2 and IL3 and derives a lane on the basis of the derived interval and a reference distance. As shown in the drawing, similar to the process described above, in a case in which the interval between the virtual lines IL2 and IL3 corresponds to twice the reference distance d (for example, a distance corresponding to a general lane width), a virtual road partition line IL14 is set at center points between the virtual lines IL2 and IL3. In a case in which the number of lanes and a lane width near detected delineators are stored in the second map information 62, the road partition line IL14 is set on the basis of the number of lanes and the lane width. The setter 142 sets an area between the virtual road partition line IL14 and the virtual line IL12 as a runnable area.

As described above, in a case in which the position of a road partition line cannot be recognized by the recognizer 130, the action plan generator 140 controls at least steering of the subject vehicle M on the basis of positions of objects, of which a reflectivity is equal to or greater than a predetermined value, detected by the object recognizing device 16, whereby an area in which the vehicle can run can be recognized with a higher accuracy.

[Example of Case in which One Delineator is Present at End of Road]

Figure 13:
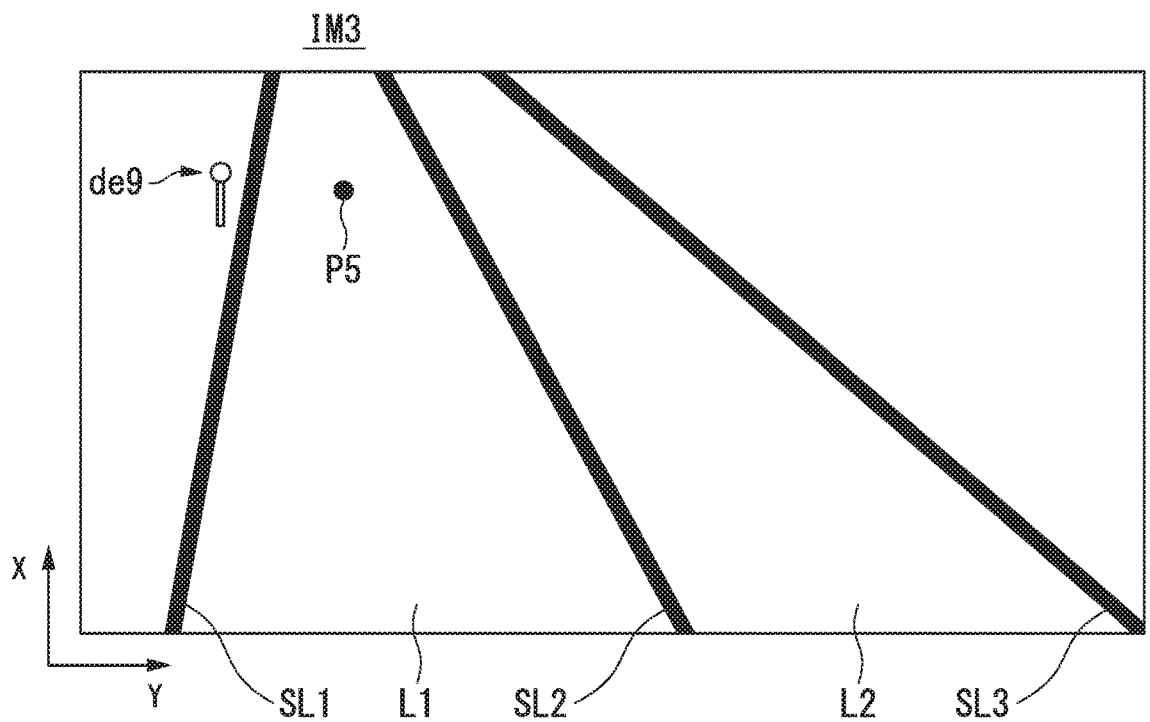
FIG. 13 is a diagram showing one example of an image in which a road on which one delineator is present is captured.

FIG. 13 is a diagram showing one example of an image IM3 in which a road on which one delineator is present is captured. Points different from the image IM1 will be focused in description. The image IM3 includes one delineator de9 installed to the left side of the road partition line SL1. This delineator is one example of "an object of which a reflectivity is equal to or greater than a predetermined value."

The recognizer 130 detects the delineator de9 on the basis of a result of detection, which is acquired by the finder 14, output by the object recognizing device 16. Then, the recognizer 130 converts the position of the detected delineator de9 into a position on an actual plane, thereby recognizing the position of the delineator de9.

The setter 142 sets a runnable area on the basis of the delineator de9. For example, the setter 142 sets a position P5 of a predetermined distance from the position of the delineator de9 in the direction of +Y (or an angle θ from the direction of +Y) and controls the subject vehicle M such that the reference point of the subject vehicle M passes through the set position P5.

As described above, in a case in which the position of a road partition line cannot be recognized by the recognizer 130, the action plan generator 140 controls at least the steering of the subject vehicle M on the basis of the position of one object of which a reflectivity is equal to or greater than a predetermined value, whereby an area in which the vehicle can run can be recognized with a higher accuracy.

In each of the examples described above, the setter 142 may set a runnable area by taking types, positions, and the like of objects recognized by the object recognizing device 16 into account in addition to the object, of which a reflectivity is a predetermined value or more, recognized by the recognizer 130. For example, objects recognized by the object recognizing device 16, for example, are surrounding vehicles (for example, a vehicle running ahead and a vehicle running behind, an oncoming vehicle, and the like) and objects installed on a road (for example, traffic signals, marks, a median strip, and the like).

For example, the setter 142 may correct a runnable area, which is set on the basis of the position of a delineator, on the basis of positions and types of objects recognized by the object recognizing device 16 or correct a runnable area set on the basis of positions and types of objects recognized by the object recognizing device 16 on the basis of the position of a delineator. More specifically, for example, in a case in which a vehicle running ahead and a vehicle running behind are running with deviating from a runnable area set by the subject vehicle M, the setter 142 corrects the runnable area to include positions at which the vehicle running ahead and the vehicle running behind are running.

Specific Process Example 2

Figure 14:
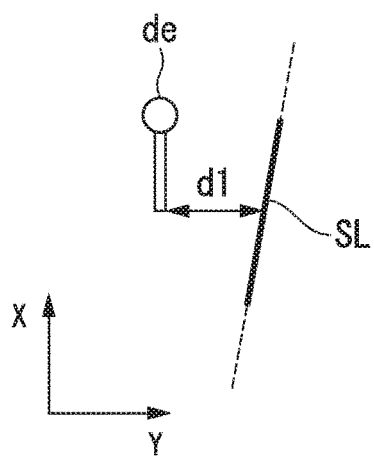
FIG. 14 is a diagram conceptually showing a positional relationship stored in second map information.

One example of a case in which a positional relationship between a delineator and a road partition line is stored in the second map information 62 will be described. FIG. 14 is a diagram conceptually showing a positional relationship stored in the second map information 62. In the second map information 62, position information of a delineator de and a distance d1 from the delineator de to a road partition line SL are stored in association with each other.

Figure 15:
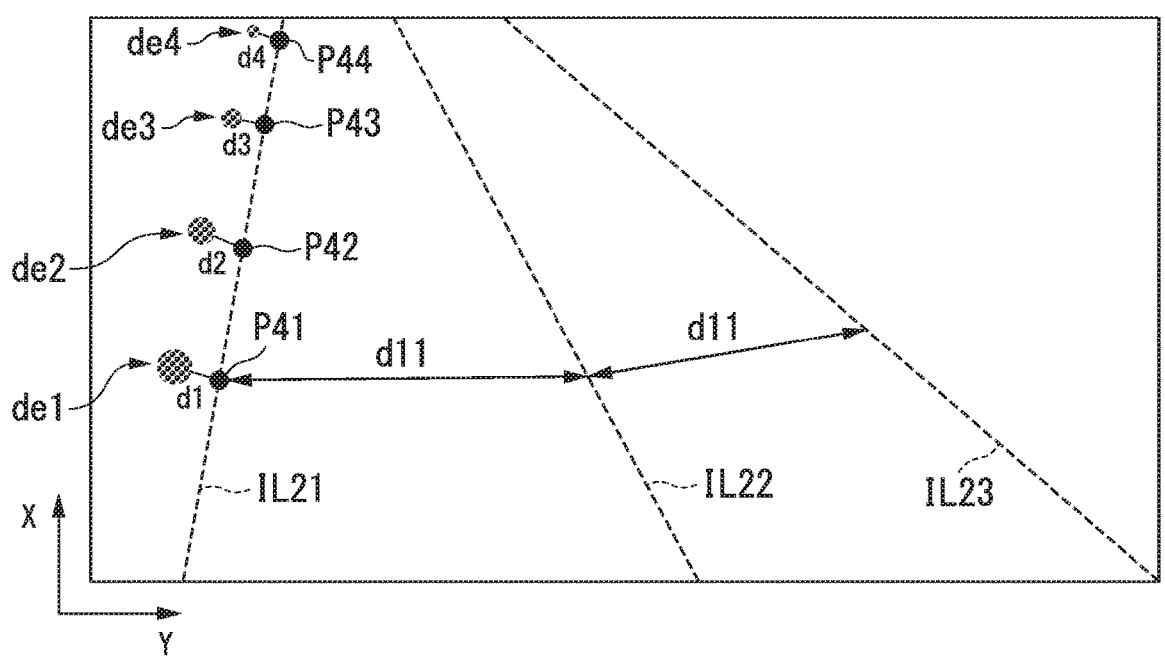
FIG. 15 is a diagram showing one example of a process executed by a setter.

In this case, the setter 142 sets a running area on the basis of the delineator de and the positional relationship described above. FIG. 15 is a diagram showing one example of a process executed by the setter 142. Points different from the case shown in FIG. 8 will be described. The setter 142 sets positions P41 to P44 at positions of a distance d1 from positions of delineators de1 to de4 in the direction of +Y and sets a virtual line IL21 set in the direction X such that it passes through the set positions.

Next, the setter 142 sets a virtual line IL22 at a position of a distance d11 from the virtual line IL21 in the direction of +Y and sets a virtual line IL23 at a position of a distance d11 from the virtual line IL22 in the direction of +Y. The distance d11, for example, is a distance corresponding to the width of the lane stored in the second map information 62. Then, the setter 142 regards an area between the virtual line IL21 and the virtual line IL22 as a running lane of the subject vehicle M and regards an area between the virtual line IL22 and the virtual line IL23 as an opposite lane of the subject vehicle M.

As described above, in a case in which the position of a road partition line is not recognized by the recognizer 130, and positions of objects of which a reflectivity is equal to or greater than a predetermined value are recorded in the second map information 62, the action plan generator 140 controls at least the steering of the subject vehicle M on the basis of the positions of the objects, of which a reflectivity is equal to or greater than a predetermined value, detected by the object recognizing device 16, whereby an area in which a vehicle can run can be recognized with a higher accuracy.

[Flowchart]

Figure 16:
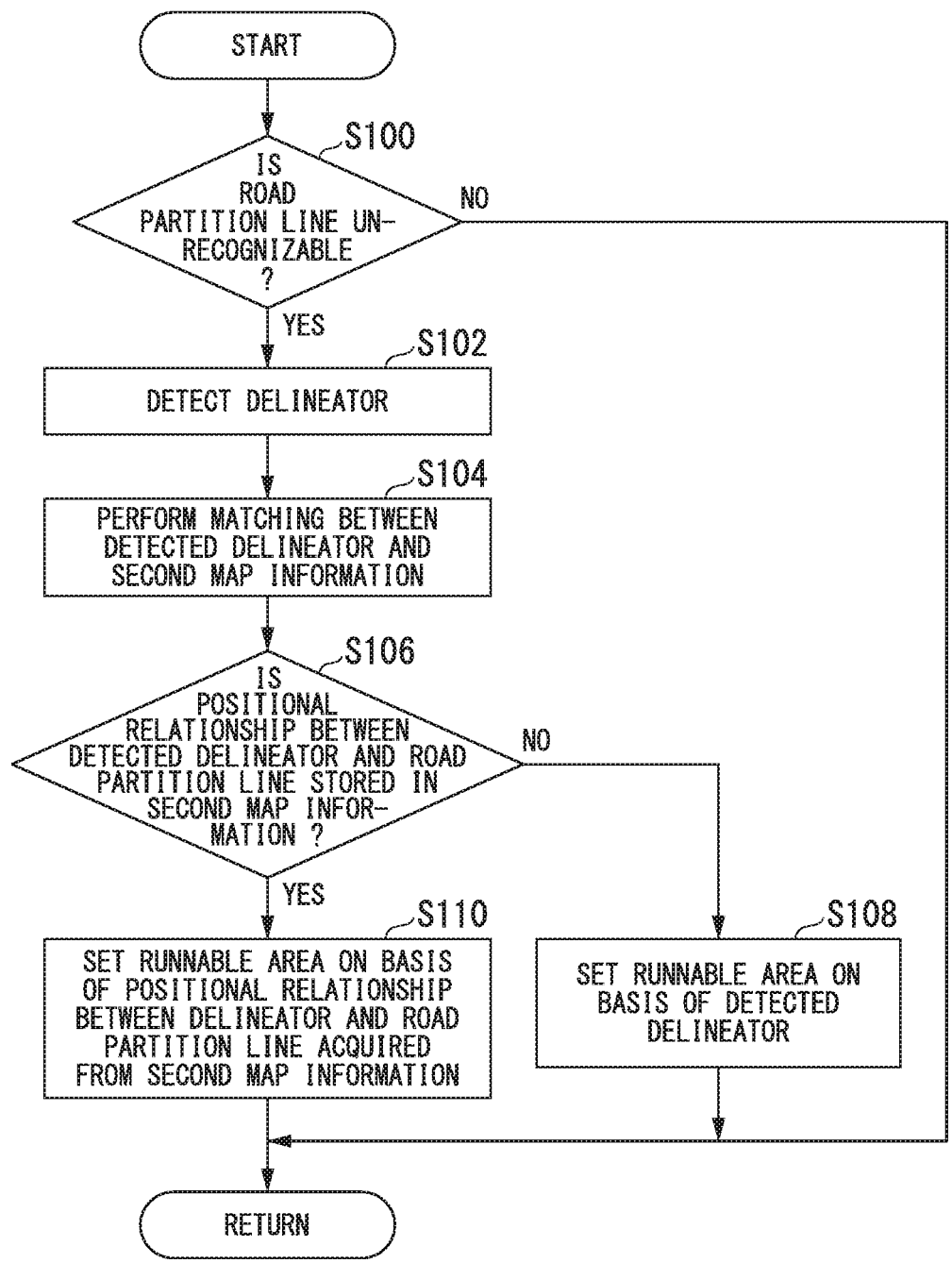
FIG. 16 is a flowchart showing the flow of a process executed by a first controller.

FIG. 16 is a flowchart showing the flow of a process executed by the first controller 120. First, the recognizer 130 determines whether or not a road partition line has been recognized on the basis of information acquired from the object recognizing device 16 (Step S100). In a case in which a road partition line has been recognized, the process of one routine of this flowchart ends.

On the other hand, in a case in which a road partition line has not been recognized, the recognizer 130 detects a delineator (Step S102). Next, the setter 142 identifies the position of the detected delineator and matches the detected delineator with the information of the second map information 62 (Step S104). For example, the setter 142 refers to position information of a delineator in the second map, and identifies the information of the detected delineator based on the position of the detected delineator. Next, the setter 142 determines whether or not a positional relationship between the detected delineator and a road partition line is stored in the second map information 62 (Step S106).

In a case in which the positional relationship is not stored, the setter 142 sets a runnable area on the basis of the detected delineator (Step S108). In other words, a running area is set by executing the process of [Specific process example 1].

On the other hand, in a case in which the positional relationship is stored, the setter 142 sets the runnable area on the basis of the positional relationship between the detected delineator and the road partition line that is acquired from the second map information 62 (Step S110). In other words, a runnable area is set by executing the process of [Specific process example 2]. Accordingly, the process of one routine of this flowchart ends. One of the processes of Steps S110 and S108 described above may be omitted.

As described above, in a case in which the position of a road partition line cannot be recognized by the recognizer 130, in a case in which the position of a delineator is recorded in the second map information 62, the action plan generator 140 controls at least steering of the subject vehicle M on the basis of the position of the detected delineator and a positional relationship of the delineator stored in the second map information 62. On the other hand, the action plan generator 140, in a case in which the position of a delineator is not recorded in the second map information 62, controls at least steering of the subject vehicle M on the basis of the position of the detected delineator. Accordingly, an area in which a vehicle can run can be recognized with a higher accuracy.

According to the embodiment described above, in a case in which the position of a road partition line cannot be recognized by the recognizer 130, the vehicle control device controls at least steering of the subject vehicle M on the basis of the position of an object, of which a reflectivity is equal to or greater than a predetermined value, detected by the object recognizing device 16, whereby an area in which a vehicle can run can be recognized with a higher accuracy.

[Hardware Configuration]

Figure 17:
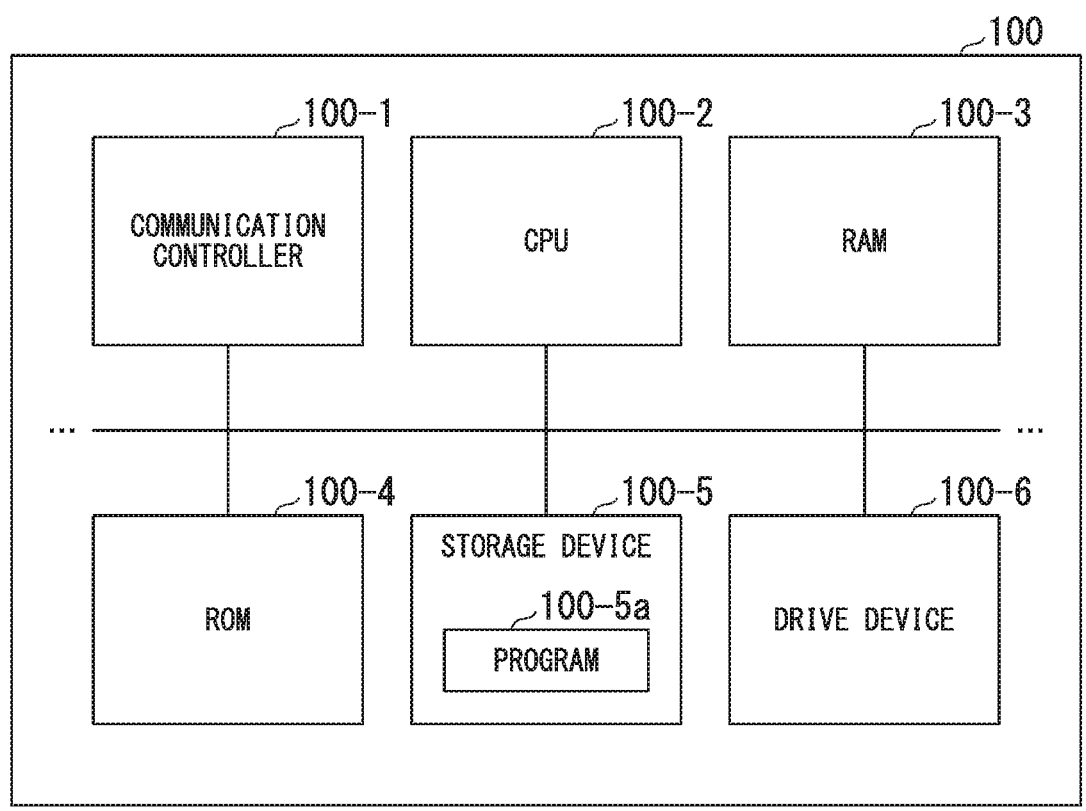
FIG. 17 is a diagram showing one example of the hardware configuration of an automated driving control device according to an embodiment.

The automated driving control device 100 according to the embodiment described above, for example, is realized by a hardware configuration as shown in FIG. 17. FIG. 17 is a diagram showing one example of the hardware configuration of the automated driving control device 100 according to an embodiment.

The automated driving control device 100 has a configuration in which a communication controller 100-1, a CPU 100-2, a RAM 100-3, a ROM 100-4, a storage device 100-5 such as a flash memory or an HDD, and a drive device 100-6 are interconnected through an internal bus or a dedicated communication line. A portable storage medium such as an optical disc is loaded into the drive device 100-6. A program 100-5a stored in the storage device 100-5 is stored into the RAM 100-3 by a DMA controller (not shown in the drawing) or the like and is executed by the CPU 100-2, whereby the first controller 120 and the second controller 160 are realized. The program referred to by the CPU 100-2 may be stored in the portable storage medium loaded into the drive device 100-6 or may be downloaded from another device through a network NW.

The embodiment described above may be represented as below.

A vehicle control device includes a storage device and a hardware processor executing a program stored in the storage device, wherein the hardware process, by executing the program described above, is configured to recognize a position of a road partition line on the basis of an image captured by an image capturer that images surroundings of the vehicle, control at least steering of the vehicle on the basis of the position of the recognized road partition line, detect objects in the vicinity of the vehicle by emitting radiowaves and detecting reflected waves generated when the radiowaves are brought into contact with the objects and, in a case in which the position of a road partition line cannot be recognized, control at least steering of the vehicle on the basis of the position of a detected object of which a reflectivity is equal to or greater than a predetermined value.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
  an image capturer configured to image surroundings of a vehicle;
  a road partition line recognizer configured to recognize a position of a road partition line based on an image captured by the image capturer;
  a driving controller configured to control at least steering of the vehicle based on the position of the road partition line recognized by the road partition line recognizer; and
  an object detector configured to detect objects in a vicinity of the vehicle by emitting radio waves and detecting reflected waves generated due to the radio waves coming into contact with objects,
  wherein
  the driving controller is configured to,
    in a case in which the position of a road partition line is unrecognizable using the road partition line recognizer, control at least the steering of the vehicle based on a position of an object detected by the object detector as having a reflectivity that is equal to or greater than a predetermined value,
    in a case in which the position of the object is stored in map information, control at least the steering of the vehicle based on a position relationship between the object detected by the object detector and the road partition line as defined in the map information, and
    in a case in which the position of the object is not stored in the map information, control at least the steering of the vehicle based on the position of the object detected by the object detector.

2. The vehicle control device according to claim 1, wherein the driving controller is further configured to, in a case in which the position of the road partition line is unrecognizable using the road partition line recognizer, control at least the steering of the vehicle based on positions of objects disposed at predetermined intervals along a road that are detected by the object detector as having reflectivities equal to or greater than a predetermined value.

3. The vehicle control device according to claim 2, wherein the driving controller is further configured to,
  in a case in which the position of the road partition line is unrecognizable using the road partition line recognizer, estimate positions of ends of a road in a widthwise direction based on positions of objects disposed at predetermined intervals along the road that are detected by the object detector as having reflectivities equal to or greater than a predetermined value and
  control at least the steering of the vehicle based on the positions of the ends.

4. A vehicle control method comprising:
  imaging, by an image capturer, surroundings of a vehicle,
  recognizing, by a road partition line recognizer, a position of a road partition line based on an image captured by the image capturer;
  controlling, by a driving controller, at least steering of the vehicle based on the position of the road partition line recognized by the road partition line recognizer;
  detecting, by an object detector, objects in a vicinity of the vehicle by emitting radio waves and detecting reflected waves generated due to the radio waves coming into contact with the objects;

in a case in which the position of the road partition line is unrecognizable using the road partition recognizer, controlling, by the driving controller, at least the steering of the vehicle based on a position of an object detected by the object detector as having a reflectivity that is equal to or greater than a predetermined value, wherein the controlling based on the position of the object comprises:

in a case in which the position of the object is stored in map information, controlling, by the driving controller, at least the steering of the vehicle based on a position relationship between the object detected by the object detector and the road partition line as defined in the map information; and in a case in which the position of the object is not stored in the map information, controlling, by the driving controller, at least the steering of the vehicle based on the position of the object detected by the object detector.

5. A non-transitory computer-readable storage medium that stores a computer program that, in response to execution by a computer, causes the computer to perform operations, the operations comprising:

imaging surroundings of a vehicle to yield an image, detecting objects in a vicinity of the vehicle by emitting radio waves and detecting reflected waves generated due to the radio waves coming into contact with the objects;

recognizing a position of a road partition line based on the image; and controlling at least steering of the vehicle based on the position of the road partition line, wherein, in a case in which the position of the road partition line is unrecognizable, the controlling comprises:

controlling at least the steering of the vehicle based on a position of an object detected as having a reflectivity equal to or greater than a predetermined value, in response to determining that the position of the object is stored in map information, controlling at least the steering of the vehicle based on a position relationship between the object and the road partition line as defined in the map information, and in response to determining that the position of the object is not stored in the map information, controlling at least the steering of the vehicle based on a detected position of the object.

* * * * *